United States Patent [19]

Morimoto et al.

[11] Patent Number: 5,684,095
[45] Date of Patent: Nov. 4, 1997

[54] HYDROXYL-CONTAINING POLYESTER, POLYEPOXIDE AND SILICON COMPOUND

[75] Inventors: Kotaro Morimoto; Chicara Kawamura, both of Hiratsuka; Noboru Nakai, Isehara; Haruhiko Aida; Noboru Takoh, both of Hiratsuka; Satoru Ito, Kanagawa-ken, all of Japan

[73] Assignee: Kansai Paint Company, Limited, Amagasaki, Japan

[21] Appl. No.: 678,743

[22] Filed: Jul. 11, 1996

[30] Foreign Application Priority Data

Jul. 19, 1995 [JP] Japan .................. 7-182846

[51] Int. Cl.$^6$ ............... C08L 63/00; C08L 67/02
[52] U.S. Cl. ........................... 525/438; 525/476
[58] Field of Search ...................... 525/438, 476

[56] References Cited

U.S. PATENT DOCUMENTS

| | | | |
|---|---|---|---|
| 5,026,793 | 6/1991 | Nakai et al. | 525/476 |
| 5,166,265 | 11/1992 | Nakahata et al. | 525/101 |
| 5,218,018 | 6/1993 | Tominaga et al. | 525/438 |

*Primary Examiner*—Robert E. Sellers
*Attorney, Agent, or Firm*—Armstrong, Westerman, Hattori, McLeland & Naughton

[57] ABSTRACT

The invention relates to a curable coating composition comprising:

(a) a hydroxyl-containing polyester resin having a solubility parameter in the range of 10.0 to 12.0,
(b) a polyepoxide,
(c) a silicon compound having 1 to 20 silicon atoms in one molecule and represented by the rational formula $$SiO_{(4-(a+b))/2}(OR^1)_a(OR^2)_b \qquad (1)$$

wherein $R^1$ is an alkyl group having 1 to 3 carbon atoms, or a hydrogen atom, $R^2$ is an aryl group, an aralkyl group, or a monovalent hydrocarbon group containing an ether linkage and/or ester linkage and having 4 to 24 carbon atoms, a represents a number between 0.10 to 3.95 and b represents a number between 0.05 and 1.95, provided that a+b=4 or less, (d) at least one chelate compound selected from the group consisting of aluminum chelate compounds, titanium chelate compounds, zirconium chelate compounds and tin chelate compounds, and
(e) an organic solvent.

6 Claims, No Drawings

HYDROXYL-CONTAINING POLYESTER, POLYEPOXIDE AND SILICON COMPOUND

The present invention relates to a novel curable coating composition capable of forming a cured coating excellent in finished appearance.

U.S. Pat. Nos. 5,026,793, 5,284,919, 5,389,727 and 5,492,968 disclose curable coating compositions comprising a mixture of a hydroxyl-containing resin, a polyepoxide and an organosilane compound, and a metal chelate compound.

These conventional compositions, although high in curability, would have difficulty in forming a cured coating which is transparent, homogeneous and excellent in finished appearance if a polyester resin which is low in compatibility with the organosilane compound is used as a hydroxyl-containing resin.

An object of the present invention is to provide a novel curable coating composition which assures a good compatibility between a hydroxyl-containing polyester resin and a specific organosilane compound and which is, therefore, capable of forming a cured coating that is transparent, homogeneous and excellent in finished. appearance.

According to the present invention, there is provided a curable coating composition comprising:

(a) a hydroxyl-containing polyester resin having a solubility parameter in the range of 10.0 to 12.0, (b) a polyepoxide, (c) a silicon compound having 1 to 20 silicon atoms in one molecule and represented by the rational formula $$SiO_{(4-(a+b))/2}(OR^1)_a(OR^2)_b \qquad (1)$$

wherein $R^1$ is an alkyl group having 1 to 3 carbon atoms, or a hydrogen atom, $R^2$ is an aryl group, an aralkyl group, or a monovalent hydrocarbon group containing an ether linkage and/or ester linkage and having 4 to 24 carbon atoms, a represents a number between 0.10 to 3.95 and b represents a number between 0.05 and 1.95, provided that a+b=4 or less, (d) at least one chelate compound selected from the group consisting of aluminum chelate compounds, titanium chelate compounds, zirconium chelate compounds and tin chelate compounds, and (e) an organic solvent.

The inventors of the present invention conducted extensive research to overcome the above-mentioned prior art. drawbacks and found that a composition comprising a hydroxyl-containing polyester resin having a specific solubility parameter, a polyepoxide, a specific silicon compound conventionally not used for this purpose, a metal chelate compound and an organic solvent assures high compatibility and is, therefore, capable of forming a cured coating which is transparent, homogeneous and excellent in finished appearance. The present invention has been completed based on this novel finding.

The hydroxyl-containing polyester resin (a) is not specifically limited insofar as it is a hydroxyl-containing polyester resin having a solubility parameter (sp value) in the range of 10.0 to 12.0. However, it is desirable to use a hydroxyl-containing polyester resin having a hydroxyl value of 2 to 200 mg KOH/g, preferably 2 to 120 mg KOH/g in view of the curability of the composition and the durability and water resistance of the resulting coating. The term "hydroxyl value" used herein refers to a value of milligram (s) of potassium hydroxide equivalent to hydroxyl group in 1 g of the resin. A polyester resin of less than 10.0 in sp value is difficult to produce, and a polyester resin exceeding 12.0 in sp value is unsatisfactory in compatibility with the silicon compound as the component (c).

The solubility parameter referred to herein is a value given by the following equation (R. F. Fedors, Polym. Eng. Sci., 14, [2] 147 (1974))

$$sp = \left( \frac{\Delta E}{V} \right)^{1/2}$$

wherein ΔE is a cohesive energy density and V is a molar volume.

The polyester resin (a) has an acid value of preferably 0 to 30 mg KOH/g, more preferably 0 to 20 mg KOH/g in view of the curability of the composition and the water resistance of the coating.

The polyester resin (a) has a number average molecular weight of preferably 1,000 to 30,000, more preferably 1,500 to 20,000, most preferably 2,500 to 8,000 in view of the durability of the coating and the solid content of the composition.

The polyester resin (a) has a glass transition temperature (which may be hereinafter referred to as "Tg") of preferably −40° to 60° C., more preferably −10° to 30° C. in view of the hardness and the processability of the coating.

The polyester resin (a) for use in the present invention is a hydroxyl-containing one and can be any of oil-free polyester resins, oil-modified alkyd resins, modified products of these resins, e.g. urethane-modified polyester resins and urethane-modified alkyd resins.

The oil-free polyester resins are generally esters of polybasic acids with polyhydric alcohols. Examples of polybasic acids are phthalic acid, isophthalic acid, terephthalic acid, 2,6-naphthalene dicarboxylic acid, 4,4'-diphenylmethane dicarboxylic acid, tetrahydrophthalic acid, methyltetrahydrophthalic acid, hexahydrophthalic acid, methylhexahydrophthalic acid, hexahydroterephthalic acid, hexahydroisophthalic acid, cyclohexane-1,3,5-tricarboxylic acid, trihydrotrimellitic acid, dihydropyromellitic acid, endomethylene hexahydrophthalic acid, methylendomethylene hexahydrophthalic acid, maleic acid, fumaric acid, itaconic acid, succinic acid, glutaric acid, adipic acid, azelaic acid, pimelic acid, suberic acid, sebacic acid, dimeric fatty acid (dimer acid), trimellitic acid, pyromellitic acid, anhydrides of these acids, etc. These polybasic acids can be used either alone or in mixture.

Examples of polyhydric alcohols are ethylene glycol, diethylene glycol, propylene glycol, 1,4-butanediol, neopentyl glycol, 1,5-pentanediol, 1,6-hexanediol, cyclohexanediol, 1,4-dihydroxymethylcyclohexane, 1,3-dihydroxymethylcyclohexane, glycerin, trimethylolethane, trimethylolpropane, pentaerythritol, etc. These polyhydric alcohols can be used either alone or in mixture. Lactones such as ε-caprolactone, γ-valerolactone, etc. can be used in said esterification reaction. The esterification reaction can be carried out by conventional methods.

The oil-free polyester resins can be prepared also by transesterification reaction using a lower alkyl ester (such as methyl ester, ethyl ester, etc.) of polybasic acid in place of the polybasic acid in the foregoing esterification reaction. The transesterification reaction of the two components can be performed by conventional methods.

The oil-modified alkyd resin can be prepared by conventional methods as by reacting an oil fatty acid in addition to the acid component and alcohol component of the oil-free polyester resin in the esterification. Examples of oil fatty acids are coconut oil fatty acid, soybean oil fatty acid, linseed oil fatty acid, safflower oil fatty acid, tall oil fatty acid, dehydrated castor oil fatty acid, tung oil fatty acid, etc.

The urethane-modified polyester resin is prepared by conventional methods as by reacting a polyisocyanate compound with said oil-free polyester resin or a low-molecular-weight oil-free polyester resin having a number average molecular weight of about 300 to about 10,000 and prepared by the reaction of the acid component and the alcohol component in the preparation of said oil-free polyester resin.

The urethane-modified alkyd resin is prepared by conventional methods as by reacting a polyisocyanate compound with said oil-modified alkyd resin or a low-molecular-weight oil-modified alkyd resin having a number average molecular weight of about 300 to about 10,000 and prepared by the reaction of the components in the preparation of said oil-modified alkyd resin.

Examples of polyisocyanate compounds useful in the preparation of urethane-modified polyester resin or urethane-modified alkyd resin are hexamethylene diisocyanate, trimethylhexamethylene diisocyanate, isophorone diisocyanate, xylylene diisocyanate, tolylene diisocyanate, 4,4'-diphenylmethane diisocyanate, 4,4'-methylenebis(cyclohexyl isocyanate), 2,4,6-triisocyanatotoluene, 2-isocyanatoethyl-2,6-diisocyanatocaproate, etc.

The polyepoxide (b) for use in the present invention is a component for crosslinking the resin (a).

The polyepoxide (b) is a compound having an average of at least 2 epoxy groups per molecule and is preferably about 60 to about 10,000, more preferably about 65 to about 4,000, in epoxy equivalent.

The polyepoxide (b) has a number average molecular weight of about 120 to about 20,000, preferably about 240 to about 8,000. The polyepoxide having a number average molecular weight of less than about 120 is not easily available, whereas the polyepoxide exceeding about 20,000 in number average molecular weight can not provide a high solid coating composition and imparts a greater molecular weight between crosslinks, thereby reducing the solvent resistance and the scratch resistance of the coating, and is, therefore, undesirable to use.

Specific examples of the polyepoxide (b) are:

polymers prepared by radical polymerization reaction of monomers including, for example, radically polymerizable epoxy monomers such as glycidyl (meth) acrylate, allylglycidyl ether and like glycidyl group-containing monomers, 3,4-epoxycyclohexylmethyl (meth)acrylate and like alicyclic epoxy group-containing monomers and optionally other vinyl monomers such as methyl (meth)acrylate, ethyl (meth) acrylate, n-propyl (meth)acrylate, isopropyl (meth) acrylate, n-butyl (meth)acrylate, isobutyl (meth) acrylate, t-butyl (meth)acrylate, hexyl (meth)acrylate, 2-ethylhexyl (meth)acrylate, n-octyl (meth)acrylate, decyl (meth)acrylate, lauryl (meth)acrylate, stearyl (meth)acrylate and like alkyl (meth)acrylates having 1 to 24 carbon atoms, cyclohexyl (meth)acrylate, cyclopentyl (meth)acrylate and like cycloalkyl (meth) acrylates, styrene, α-methylstyrene, vinyltoluene, p-chlorostyrene and like aromatic vinyl monomers;

diglycidyl ether, 2-glycidylphenyl glycidyl ether, 2,6-diglycidylphenyl glycidyl ethers and like glycidyl ether compounds;

vinylcyclohexene dioxide, limonene dioxide and like glycidyl group- and alicyclic epoxy group-containing compounds;

dicyclopentadiene dioxide, bis(2,3-epoxycyclopentyl)-ether, epoxycyclohexenecarboxylic acid ethylene glycol diester, bis(3,4-epoxycyclohexylmethyl)adipate, 3,4-epoxycyclohexylmethyl-3,4-epoxycyclohexanecarboxylate, 3,4-epoxy-6-methylcyclohexylmethyl-3,4-epoxy-6-methylcyclohexane carboxylate, "EPOLEAD GT 300" (trade name, product of Daicel Chemical Industries, Ltd., trifunctional alicyclic epoxy compound), "EPOLEAD GT 400" (trade name, product of Daicel Chemical Industries, Ltd., tetrafunctional alicyclic epoxy compound), "CELLOXIDE 2081" (trade name, product of Daicel Chemical Industries, Ltd., ring-cleft ε-caprolactone chain-containing bifunctional alicyclic epoxy compound), "CELLOXIDE 2082" (same as above), "CELLOXIDE 2083" (same as above), "EPOLEAD GT 301" (trade name, product of Daicel Chemical Industries, Ltd., ring-cleft ε-caprolactone chain-containing trifunctional alicyclic epoxy compound), "EPOLEAD GT 302" (same as above), "EPOLEAD GT303" (same as above), "EPOLEAD GT 401" (trade name, product of Daicel Chemical Industries, Ltd., ring-cleft ε-caprolactone chain-containing tetrafunctional alicyclic epoxy compound), "EPOLEAD GT 402" (same as above), "EPOLEAD GT 403" (same as above) and like alicyclic epoxy group-containing compounds; and "EPIKOTE 1001" (trade name, product of Yuka Shell Epoxy Co., Ltd., bisphenol A epoxy resin) and like bisphenol epoxy resins, cresol novolak epoxy resins, phenol novolak epoxy resins, etc.

Among them, polyepoxides having 2 or more alicyclic epoxy groups are preferred from the standpoint of excellent low-temperature curability.

The silicon compound (c) for use in the present invention is a component which is reactive with the hydroxyl group of the polyester resin (a) and with the epoxy group of the polyepoxide (b). The compound (c) is represented by the rational formula

$$SiO_{(4-(a+b))/2}(OR^1)_a(OR^2)_b \qquad (1)$$

wherein $R^1$ is an alkyl group having 1 to 3 carbon atoms, or a hydrogen atom, $R^2$ is an aryl group, an aralkyl group, or a monovalent hydrocarbon group containing an ether linkage and/or ester linkage and having 4 to 24 carbon atoms, a represents a number between 0.10 to 3.95 and b represents a number between 0.05 and 1.95, provided that a+b=4 or less.

($OR^1$) in the silicon compound (c) represents an alkoxyl group having 1 to 3 carbon atoms or a hydroxyl group. Examples of the alkoxyl group having 1 to 3 carbon atoms are methoxy, ethoxy, n-propoxy and isopropoxy.

Examples of the aryl group and aralkyl group represented by $R^2$ are phenyl, toluyl, xylyl and like aryl groups, and benzyl, phenethyl and like aralkyl groups (alkyl substituted by aryl).

The monovalent hydrocarbon group of 4 to 24 carbon atoms containing an ether linkage and/or ester linkage and represented by $R^2$ can be any of alkyl and like aliphatic hydrocarbon groups, cycloalkyl and like alicyclic hydrocarbon groups, aryl, aralkyl and like aromatic hydrocarbon groups and mixtures of these hydrocarbon groups insofar as they are hydrocarbon groups containing an ether linkage and/or ester linkage.

Specific examples of the groups represented by ($OR^2$) are phenoxy, tolyloxy and like aryloxy groups; benzyloxy, phenethyloxy and like aralkyloxy groups; groups containing an ether linkage and represented by the following formula (2); groups containing an ester linkage and represented by the following formula (3) or (4); groups containing an ether linkage and an ester linkage and represented by the following formula (5); etc. Formula (2)

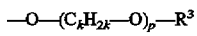

wherein k is an integer of 1 to 7, p is an integer of 1 to 9 and $R^3$ is an alkyl group having 1 to 8 carbon atoms, an aryl group or an aralkyl group.

Specific examples of the group containing an ether linkage and represented by the formula (2) are butoxyethyloxy, phenoxyethyloxy, 3-methoxy-3-methylbutoxy, groups represented by —O—$(C_2H_4O)_2$—$C_4H_9$, etc.

Formula (3)

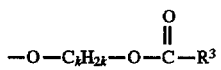

wherein k and $R^3$ are as defined above.

Formula (4)

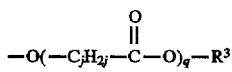

wherein j is an integer of 1 to 5, q is an integer of 1 to 3 and $R^3$ is as defined above.

Examples of the groups containing an ester linkage and represented by the formula (3) or (4) include groups represented by the following formulas.

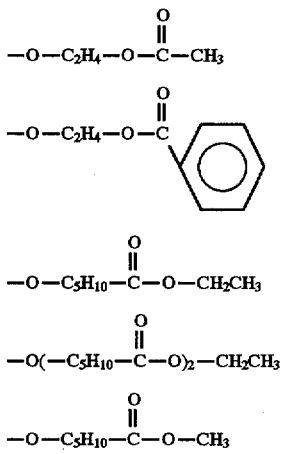

Formula (5)

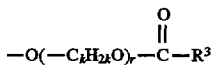

wherein r is an integer of 2 to 9, and k and $R^3$ are as defined above.

Examples of the group containing an ether linkage and an ester linkage and represented by the formula (5) are groups represented by the following formulas:

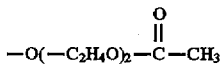

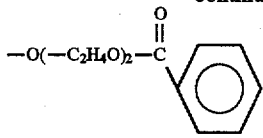

Among the groups of ($OR^2$) represented by the formulas (2) to (5), the groups of the formula (4) are preferred and those wherein j is 5 are more preferred.

Examples of the silicon compound (c) include, for example, the silicon monomer of the formula (6) to be shown below; homo-condensates of said silicon monomers; co-condensates of said silicon monomer with a tetraalkoxysilane of the formula (7) to be shown below or its condensate; reaction products prepared by ether exchange reaction of said tetraalkoxysilane or its condensate with the hydroxyl-containing monovalent hydrocarbon represented by the formula $R^2OH$ wherein $R^2$ is as defined above; ring-cleft addition products of said tetraalkoxysilane or its condensate with a lactone compound; etc.

Formula (6)

wherein all occurrences of $R^1$ are the same or different and mean the same as above, all occurrences of $R^2$ are the same or different and mean the same as above, m is an integer of 2 or 3, and n is an integer of 1 or 2, provided that m+n=4.

Specific examples of the silicon monomer represented by the formula (6) are triethoxyphenoxysilane, trimethoxyphenoxysilane, triethoxybenzyloxysilane, triethoxy-(phenethyloxy)silane, diethoxydiphenoxysilane, dimethoxy-di(butoxyethyloxy)silane, diethoxy-di(butoxyethyloxy)silane, trimethoxy(butoxyethyloxy)silane, triethoxy(butoxyethyloxy)-silane, dimethoxy-di(phenoxyethyloxy)silane, diethoxy-di(phenoxyethyloxy)silane, trimethoxy(phenoxyethyloxy)-silane, triethoxy(phenoxyethyloxy)silane, dimethoxy-di[2-(acetoxy)pentyloxy]silane, diethoxy-di[2-(acetoxy)-pentyloxy]silane, trimethoxy-2-(acetoxy)pentyloxysilane, triethoxy-2-(acetoxy)pentyloxysilane, dimethoxy-di[2-(ethoxy)pentyloxy]silane, diethoxy-di[2-(ethoxy)pentyloxy)silane, trimethoxy-2-(ethoxy)pentyloxysilane, triethoxy-2-(ethoxy)pentyloxysilane, etc.

Formula (7)

wherein all occurrences of $R^1$ are the same or different and mean the same as above.

Examples of the tetraalkoxysilane represented by the formula (7) are tetramethoxysilane, tetraethoxysilane, tetrapropoxysilane, dimethoxydiethoxysilane, dimethoxydipropoxysilane, etc.

Examples of the condensate of tetraalkoxysilane include commercial products available under the trade name "COLCOAT ES40" (trade name, product of Colcoat Co., Ltd., monomer to decamer of tetraethyl silicate, approximately pentamer on an average), "COLCOAT MS51" (trade name, product of Colcoat Co., Ltd., approximately tetramer of tetramethyl silicate on an average), and so on.

Homo- or co-condensation reaction can be conducted by conventional methods to give a homo-condensate of silicon monomers of the formula (6), or a co-condensate of said silicon monomer with the tetraalkoxysilane of the formula (7) or its condensate. For example, condensation is conducted due to the hydrolysis caused by heating the components in the presence of a specific amount of water.

The (Si—OR$^1$) linkage can be partially replaced with (Si—OR$^2$) linkage by ether exchange reaction of tetraalkoxysilane and/or its condensate with the hydroxyl-containing monovalent hydrocarbon represented by R$^2$OH (which may contain an ether linkage and/or an ester linkage).

Examples of the hydroxyl-containing monovalent hydrocarbon represented by R$^2$OH are phenol; cresol and like hydroxyl-containing aryl compounds; benzyl alcohol and like aralkyl alcohols; hydroxyl-containing ethers (useful in the introduction of the group of the formula (2)) prepared by etherifying the hydroxyl group on one molecule end of (poly)ethylene glycol, (poly)propylene glycol, 1,1-dimethyl-1,3-propylene glycol or like (poly)alkylene glycols with monovalent alkanol of 1 to 8 carbon atoms represented by R$^3$OH (wherein R$^3$ is as defined above), phenol or aralkyl alcohol; hydroxyl-containing esters (useful in the introduction of the group of the formula (3)) prepared by esterifying the hydroxyl group on one molecule end of ethylene glycol, propylene glycol or like alkylene glycols with monocarboxylic acid of 2 to 8 carbon atoms represented by R$^3$COOH (wherein R$^3$ is as defined above); hydroxyl-containing esters (useful in the introduction of the group of the formula (4)) prepared by cleaving the ring of a lactone such as ε-caprolactone using an initiator such as the compound of R$^3$OH and when required by polymerization thereof; hydroxyl-containing compounds having an ester linkage and an ether linkage (useful in the introduction of the group of the formula (5)) and prepared by esterifying the hydroxyl group on one molecule end of the polyalkylene glycol with the monocarboxylic acid of 2 to 8 carbon atoms represented by R$^3$COOH; etc.

The reaction of the tetraalkoxysilane and/or its condensate with the hydroxyl-containing monovalent hydrocarbon is conducted in the conventional manner as by mixing the components or adding dropwise the latter to the former and heating the components for reaction, optionally in the presence of an ether exchange catalyst such as tris (acetylacetonato)aluminum, n-butyltin trioctanoate or the like, at a temperature of about 80 to about 200° C. for about 1 to about 10 hours.

The amount of the catalyst used is about 0.001 to about 1% by weight, preferably about 0.003 to about 0.1% by weight, based on the total amount of the tetraalkoxysilane and/or its condensate and the hydroxyl-containing monovalent hydrocarbon compound.

The ring-cleaving addition reaction is conducted between the tetraalkoxysilane and/or its condensate with the lactone compound, whereby the (Si—OR$^1$) linkage can be partially replaced with the (Si—OR$^2$) linkage having a ring-cleft ester group.

Examples of the lactone compound are δ-valerolactone, ε-caprolactone, ξ-enalactone, η-capryrolactone, γ-valerolactone, δ-caprolactone, ε-enalactone, ξ-capryrolactone, etc. among which ε-caprolactone is preferred.

The ring-cleaving addition reaction of the tetraalkoxysilane and/or its condensate with the lactone compound is carried out in the conventional manner as by mixing them or adding dropwise the latter to the former. Preferably the reaction is performed in the presence of an addition catalyst for cleaving the lactone ring. The addition catalyst which can be used are organotin compounds such as n-butyltin trioctanoate, dibutyltin dilaurate, dimethyltin dichloride, dibutyltin dichloride, dibutyltin diacetate, etc.; halogenated tin compounds such as stannous chloride, stannic chloride, etc.; organic zirconium compounds; organic titanium compounds such as tetrabutyl titanate, tetrabutoxy titanate, tetraethyl titanate, etc.; Lewis acids such as boron trifluoride, aluminum trichloride, zinc chloride, titanium chloride, etc.; and fluoride salts such as tetrabutylammonium fluoride, cesium fluoride, potassium fluoride, rubidium fluoride; etc. to which useful catalysts are not limited. These catalysts can be used either alone or in mixture.

The amount of the catalyst used is about 0.01 to about 10% by weight, preferably about 0.2 to about 4.0% by weight, based on the total amount of the tetraalkoxysilane and/or its condensate and the lactone compound.

The ring-cleaving addition reaction can be suitably carried out in the absence of a solvent or in the presence of an inert solvent at a temperature of about 80° to about 200° C., preferably about 100 to about 180° C. The reaction time is about 1 to about 20 hours.

Useful inert solvents are, for example, toluene, xylene, hexane, heptane and like hydrocarbons, ethyl acetate, butyl acetate and like esters, acetone, methyl ethyl ketone and like ketones, dichloromethane, chloroform and like halogenated hydrocarbons, etc. These solvents can be used either alone or in mixture. If a solvent which is active in the reaction, e.g. hydroxyl-containing solvent, is used in a large amount, the modification coefficient of the lactone is reduced. Hence its use is undesirable.

The silicon compound (c) has 1 to 20, preferably 4 to 8 silicon atoms, per molecule. The presence of more than 20 silicon atoms per molecule lowers the compatibility of the compound (c) with the polyester resin, making it difficult to produce a transparent, homogeneous cured coating.

The silicon compound (c) has a number average molecular weight of preferably 200 to 3,000, more preferably 500 to 2,000.

The group represented by R$^1$ in the formula (1) of the silicon compound (c) is a reactive group for forming a crosslinked coating on reaction. The alkoxyl group represented by R$^1$ and having over 3 carbon atoms results in decreased reactivity and consequently in insufficient curability. The presence of other group as R$^2$ groups in the formula (1) than as defined above, or the existence of R2 group having a less number of carbon atoms than the defined carbon number would lower the compatibility of the compound (c) with the polyester resin, making it difficult to produce a transparent, homogeneous cured coating, whereas the presence of over 24 carbon atoms reduces the hardness of the coating.

In the formula (1) of the silicon compound (c), the value a is 0.10 to 3.95, preferably 0.75 to 2.00, and the value b is 0.05 to 1.95, preferably 0.50 to 1.50. If the value a is less than 0.10, the reactivity is low and the curability is insufficient. The value a exceeding 3.95 unavoidably reduces the amount of R$^2$ group, and lowers the compatibility of the compound (c) with the polyester resin, failing to give a transparent, homogeneous cured coating. The value b less than 0.05 lowers the compatibility of the compound (c) with the polyester resin, failing to give a transparent, homogeneous cured coating. On the other hand, the value b exceeding 1.95 reduces the reactivity of the silicon compound (c). While the total of a and b is up to 4, the total range of 1.5 to 2.5 is preferred in view of the compatibility of the compound (c) with the polyester resin, and the prevention of production of undesired gel-like substance.

The chelate compound (d) in the composition of the invention is at least one metal chelate compound selected from the group consisting of aluminum chelate compounds, titanium chelate compounds, zirconium chelate compounds and tin chelate compounds and is used as the curing catalyst for the components (a) to (c).

Preferably the chelate compound (d) contains a compound which shows keto-enol tautomerism as a ligand for forming a stable ring.

Examples of the compound which shows keto-enol tautomerism are β-diketones (acetylacetone, etc.), acetoacetic acid esters (methyl acetoacetate, etc.), malonic acid esters (ethyl malonate, etc.), ketones having a hydroxyl group in the β-position (diacetone alcohol, etc.), aldehydes having a hydroxyl group in the β-position (salicyl aldehyde, etc.), esters having a hydroxyl group in the β-position (methyl salicylate, etc.) and so on. Preferred are β-diketones and acetoacetic acid ester.

Among metal chelate species, aluminum chelate compounds are preferred as the chelate compound (d). Suitable aluminum chelate compounds include tris(acetylacetonato)-aluminum, tris(propionyl acetonato)aluminum, tris(propionyl propionato)aluminum, tris(butyrylacetonato) aluminum, benzoylacetonato-bis(acetylacetonato) aluminum, bis(benzoylacetonato)-acetylacetonato aluminum, tris(benzoylacetonato)aluminum, tris(ethylacetoacetato)aluminum, tris(propylacetoacetato) aluminum, tris(butylacetoacetato)aluminum, monoethylacetoacetato-bis(acetylacetonato)aluminum, and monoacetylacetonato-bis(ethylacetoacetato)aluminum, etc.

Typical examples of the titanium chelate compound are diisopropoxy-bis(ethylacetoacetato)titanium, diisopropoxy-bis(acetylacetonato)titanium, etc.

Representative examples of the zirconium chelate compound are tetrakis(acetylacetonato)zirconium, tetrakis(ethylacetoacetato)zirconium, etc.

Illustrative examples of the tin chelate compound are bis(acetylacetonato)monobutyltin octanoate, bis(acetylacetonato)monobutyltin acetate, bis(benzoylacetonato)monobutyltin octanoate, bis(benzoylacetonato)monobutyltin acetate, etc.

The amounts of the components (a) to (d) in the composition of the invention are not specifically limited. Yet the following proportions are preferred in view of the finished appearance, curability, water resistance and like coating properties.

Five to 94% by weight, preferably 14 to 75% by weight, of the component (a), 5 to 94% by weight, preferably 10 to 75% by weight, of the component (b), 0.1 to 50% by weight, preferably 0.5 to 30% by weight, of the component (c), and 0.01 to 10% by weight, preferably 0.1 to 5% by weight, of the component (d).

The organic solvent (e) is a component for dissolving or dispersing the components (a) to (d). The solvent (e) is not specifically limited and can be suitably selected from the conventional organic solvents without specific limitation insofar as it is capable of dissolving or dispersing the components (a) to (d) therein.

Examples of the organic solvent (e) are toluene, xylene and like aromatic hydrocarbons, acetone, methyl ethyl ketone, methyl isobutyl ketone and like ketones, ethyl acetate, propyl acetate, butyl acetate and like esters, ethylene glycol monobutyl ether and like alcohols, etc.

The organic solvent (e) is used in an amount which is sufficient to adjust the solids content of the composition to about 10 to about 90% by weight.

The composition of the invention may contain a silane coupling agent, when so required, in addition to the components (a) to (e). The use of silane coupling agent assures the advantages of, e.g. enhancing the adhesion to a substrate without reducing the curability. Examples of the silane coupling agent are epoxycyclohexylethyl trimethoxysilane, glycidoxypropyl trimethoxysilane, aminoethylamino-propyl trimethoxysilane, phenyltrimethoxysilane, phenethyltrimethoxysilane, etc.

When the silane coupling agent is incorporated into the composition of the invention, the amount of the agent is less than 10 parts by weight per 100 parts by weight of the total amount of the components (a) to (d).

The composition of the invention may further contain additives for coating compositions, when required, including curing catalysts, coloring pigments, extender pigments, UV absorbers, UV stabilizers, rheology control agents, etc.

The composition of the invention can be applied directly to substrates of metals, plastics or other materials or to those coated with a primer.

The coating composition of the invention is applied to a dry film thickness of about 1 to about 100 μm, preferably about 10 to about 50 μm. The applied composition is heated for curing at a temperature of about 60° to about 300° C. for about 30 seconds to about 180 minutes.

The hydroxyl-containing polyester resin having a specific sp value and the specific silicon compound used in the composition of the invention significantly increase the compatibility between the polyester resin, silicon compound and polyepoxide, and assures effective reaction of these components, consequently enabling the formation of coating which is excellent in finished appearance and coating performance (acid resistance, water resistance, weatherability, impact resistance, etc.).

The present invention is described below in more detail with reference to the following preparation examples, examples and comparative examples wherein the parts and the percentages are all by weight.

PREPARATION EXAMPLE 1

(Preparation of Oil-Free Polyester Resin Solution (A))

The following components were placed into a flask equipped with a thermometer, stirrer and water separator:

| | |
|---|---|
| Hexahydroterephthalic acid | 307 parts |
| Hexahydrophthalic cacid | 275 parts |
| Trimellitic acid | 90 parts |
| 1,4-Di(hydroxymethyl)cyclohexane | 474 parts |
| 1,6-Hexanediol | 166 parts |
| Monobutyltin hydroxide | 0.1 part |

The contents were heated with stirring to 240° C. over a period of 4 hours and maintained at the same temperature for 2 hours. Then, xylene was added in an amount of 4% based on the total amount of the components to accelerate the removal of condensed water produced as a by-product. The reaction was made to further proceed at 240° C. and heating was stopped when the acid value reached 8 mg KOH/g. The reaction mixture was diluted with cyclohexanone, giving a solution of hydroxyl-containing polyester resin having a solid content of about 60% (solution (A)). The obtained resin had a number average molecular weight of 3,300, a hydroxyl value of 48 mg KOH/g, a sp value of 10.7 and Tg of 14° C.

PREPARATION EXAMPLE 2

(Preparation of Oil-Free Polyester Resin Solution (B))

| | |
|---|---|
| Phthalic anhydride | 102 parts |
| Adipic acid | 43 parts |
| Trimethylol ethane | 20 parts |
| Neopentyl glycol | 88 parts |
| Monobutyltin hydroxide | 0.02 part |

The procedure of Preparation Example 1 was repeated with the exception of charging the above-mentioned components into a flask in the beginning, giving a solution of hydroxyl-containing polyester resin having a solid content of about 60% (solution (B)). The obtained resin had a number average molecular weight of 4,400, a hydroxyl value of 58 mg KOH/g, a sp value of 11.3 and Tg of −8° C.

PREPARATION EXAMPLE 3

(Preparation of Oil-Free Polyester Resin Solution (C))

| | |
|---|---|
| Isophthalic acid | 410 parts |
| Hexahydrophthalic acid | 380 parts |
| Neopentyl glycol | 311 parts |
| Hexanediol | 233 parts |
| Monobutyltin hydroxide | 0.1 part |

The procedure of Preparation Example 1 was repeated with the exception of charging the above-mentioned components into a flask in the beginning and stopping heating when the acid value reached 2 mg KOH/g, giving a solution of hydroxyl-containing polyester resin having a solid content of about 60% (solution (C)). The obtained resin had a number average molecular weight of 28,000, a hydroxyl value of 2 mg KOH/g, asp value of 10.7 and Tg of 8° C.

PREPARATION EXAMPLE 4

(Preparation of Oil-Free Polyester Resin Solution (D))

| | |
|---|---|
| Isophthalic acid | 239 parts |
| Hexahydrophthalic acid | 469 parts |
| Trimethylolpropane | 73 parts |
| Neopentyl glycol | 336 parts |
| Hexanediol | 189 parts |
| Monobutyltin hydroxide | 0.1 part |

The procedure of Preparation Example 1 was repeated with the exception of charging the above-mentioned components into a flask in the beginning, giving a solution of hydroxyl-containing polyester resin having a solid content of about 60% (solution (D)). The obtained resin had a number average molecular weight of 1,200, a hydroxyl value of 113 mg KOH/g, a sp value of 11.1 and Tg of 1° C.

PREPARATION EXAMPLE 5

(Preparation of Oil-Free Polyester Resin Solution (E) for Cmparison)

| | |
|---|---|
| Isophthalic acid | 711 parts |
| Terephthalic acid | 178 parts |
| Glycerin | 54 parts |
| Neopentyl glycol | 306 parts |
| Ethylene glycol | 144 parts |
| Monobutyltin hydroxide | 0.1 part |

The procedure of Preparation Example 1 was repeated with the exception of charging the above-mentioned components into a flask in the beginning, giving a solution of hydroxyl-containing polyester resin having a solid content of about 60% (solution (E)). The obtained resin had a number average molecular weight of 1,900, a hydroxyl value of 79 mg KOH/g, a sp value of 12.2 and Tg of 32° C.

PREPARATION EXAMPLE 6

(Preparation of Polyepoxide (iv))

Mixed together were 5,500 parts of the polyester resin solution (A) prepared in Preparation Example 1, 296 parts of a compound of the formula shown below, 2.93 parts of dibutyltin laurate, and 197 parts of cyclohexanone. The mixture was reacted at 80° C. for 3 hours, giving a solution of polyepoxide (iv). The obtained polyepoxide (iv) had a number average molecular weight of about 3,900, a hydroxyl value of 26 mg KOH/g, an average of about 2 epoxy groups per molecule and an epoxy equivalent of 1,950.

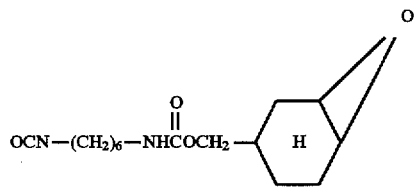

PREPARATION EXAMPLE 7

(Preparation of Polyepoxide (v))

Into a flask equipped with a thermometer and a stirrer were placed 490 parts of xylene, 137 parts of trimethylolpropane and 462 parts of hexahydrophthalic acid. The contents were heated with stirring to 130° C. over a period of 2 hours and maintained at the same temperature for 3 hours to undergo half esterification reaction. The reaction mixture was cooled to 60° C. Added to the mixture were 11 parts of tris(acetylacetonato)aluminum, 1584 parts of 3,4-epoxycyclohexylmethyl-3,4-epoxycyclohexane carboxylate and 45 parts of xylene. The contents were heated with stirring to 100° C. over a period of 1 hour to further undergo a reaction at the same temperature. Heating was stopped when the acid value reached 1 mg KOH/g. The reaction mixture was cooled, giving a solution of polyepoxide resin (v) having a solid content of about 80%. The obtained polyepoxide (v) had a number average molecular weight of about 640, a hydroxyl value of 77 mg KOH/g, an average of 2.5 alicyclic epoxy groups per molecule and an epoxy equivalent of about 260.

PREPARATION EXAMPLE 8

(Preparation of Silicon Compound (1))

Into a 4-necked flask equipped with a condenser, thermometer, nitrogen inlet tube, stirrer and dropping funnel were placed 744 g of "COLCOAT ES40" (trade name, product of Nippon Colcoat Co., Ltd., approximately pentamers of tetraethyl silicate on an average, with an average of about 12 ethoxy groups per molecule) and 7 g of n-butyltin trioctanoate. The contents were heated to 140° C. and 684 g (6 moles) of ε-caprolactone was added dropwise through a dropping funnel over 3 hours. The mixture was cooled after stirring at the same temperature for 4 hours, giving a lactone-modified silicon compound (1). The compound (1) had an average of 12 ethoxy groups per molecule among which about 6 groups were substituted with the groups of the following formula. The compound (1) possessed a number average molecular weight of about 1,600 as determined by GPC, and an average of 5 silicon atoms per molecule. In the rational formula (1), a is 1.2 and b is 1.2.

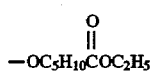

PREPARATION EXAMPLE 9

(Preparation of Silicon Compound (2))

Into a 4-necked flask equipped with a condenser, thermometer, nitrogen inlet tube, stirrer and dropping funnel were placed 470 g of "COLCOAT MS 51" (trade name, product of Nippon Colcoat Co., Ltd., approximately tetramers of tetramethyl silicate on an average, with an average of about 10 methoxy groups per molecule) and 1 g of n-butyltin trioctanoate. The contents were heated to 120°. Then, 342 g (3 moles) of ε-caprolactone was added dropwise by a dropping funnel over 3 hours. The mixture was cooled after stirring at the same temperature for 2 hours, giving a lactone-modified silicon compound (2). The compound (2) had an average of 10 methoxy groups per molecule among which about 3 groups were substituted with the groups of the following formula, and possessed a number average molecular weight of about 850 as determined by GPC, and an average of 4 silicon atoms per molecule. In the rational formula (1), a was 1.75 and b was 0.75.

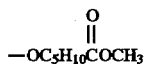

PREPARATION EXAMPLE 10

(Preparation of Silicon Compound (3))

Into a 4-necked flask equipped with a condenser, thermometer, nitrogen inlet tube, stirrer and dropping funnel was placed a mixture of 744 g of "COLCOAT ES40", 648 g of benzyl alcohol, and 0.1 g of tris(acetylacetonato)-aluminum. The contents were stirred at 160° C. for 6 hours to undergo a reaction for removal of ethanol, eliminating 276 g of ethanol. The residue was cooled to obtain a benzyl alcohol-modified silicon compound (3). The silicon compound (3) had an average of 12 methoxy groups per molecule among which about 6 groups were substituted with benzyloxy groups, and possessed a number average molecular weight of about 1,100 as determined by GPC, and an average of 5 silicon atoms per molecule. In the rational formula (1), a was 1.2 and b was 1.2.

PREPARATION EXAMPLE 11

(Preparation of Silicon Compound (4))

Into a 4-necked flask equipped with a condenser, thermometer, nitrogen inlet tube, stirrer and dropping funnel was placed a mixture of 744 g of "COLCOAT ES40", 756 g of 3-methoxy-3-methylbutanol and 0.1 g of tris (acetylacetonato)aluminum. The contents were stirred at 160° C. for 6 hours to undergo a reaction for removal of ethanol, eliminating 276 g of ethanol. The residue was cooled to obtain a 3-methoxy-3-methylbutanol-modified silicon compound (4). The silicon compound (4) had an average of 12 ethoxy groups per molecule among which about 6 groups were substituted with 3-methoxy-3-methylbutoxy groups, and possessed a number average molecular weight of about 1,200 as determined by GPC, and an average of 5 silicon atoms per molecule. In the rational formula (1), a was 1.2 and b was 1.2.

PREPARATION EXAMPLE 12

(Preparation of Silicon Compound (6) for comparison)

Into a 4-necked flask equipped with a condenser, thermometer, nitrogen inlet tube, stirrer and dropping funnel were placed 744 g of "COLCOAT ES40" and 7 g of n-butyltin trioctanoate. After the contents were heated to 140° C., 1,140 g (10 moles) of ε-caprolactone was added dropwise over 3 hours through a dropping funnel. The mixture was cooled after stirring at the same temperature for 4 hours to obtain a lactone-modified silicon compound (6). The silicon compound (6) had an average of 12 methoxy groups per molecule among which about 10 groups were substituted with the groups of the following formula, and possessed a number average molecular weight of about 1,900 as determined by GPC, and an average of 5 silicon atoms per molecule. In the rational formula (1), a was 0.5 and b was 2.0.

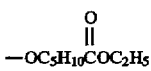

EXAMPLE 1

A 100 part quantity of TIPAQUE CR-95 (trade name, product of Ishihara Sangyo Kabushiki Kaisha, Ltd., titanium white) was admixed with 100 parts of hydroxyl-containing polyester resin solution (A) prepared in Preparation Example 1. The mixture was placed into a ball mill to accomplish pigment dispersion. To the mixture were added 30 parts of "EPOLEAD GT 401" (Daicel Chemical Industires, Ltd., ring-cleft ε-caprolactone chain-containing tetrafunctional alicyclic epoxy compound, molecular weight about 790), 10 parts of the silicon compound (1) prepared in Preparation Example 7 and 1.0 part of benzoylacetonato-bis(acetylacetonato)aluminum, followed by addition of cyclohexanone and uniform stirring, giving a coating composition with a solid content of 60%.

EXAMPLES 2 TO 18 AND COMPARATIVE EXAMPLES 1 TO 6

The procedure of Example 1 was repeated with the exception of using the hydroxyl-containing polyester resin solutions shown below in Table 1 in place of the hydroxyl-containing polyester resin solution (A), mixing the components, dispersing the pigment and thereafter mixing the other components shown in Table 1, giving coating compositions. Since the coating compositions of Comparative Examples 4 and 5 were poor in stability, causing phase separation, they were disqualified from testing for coating performance. The amounts of the starting materials shown in Table 1 are based on a solid content (effective amount in the case of metal chelate) and are all expressed in part by weight.

TABLE 1

| | Example | | | | | | | | |
|---|---|---|---|---|---|---|---|---|---|
| | 1 | 2 | 3 | 4 | 5 | 6 | 7 | 8 | 9 |
| Hydroxyl-containing polyester resin | | | | | | | | | |
| Type | A | C | A | B | C | A | C | B | B |
| Amount | 60 | 75 | 60 | 70 | 60 | 55 | 35 | 55 | 30 |
| Polyepoxide (i) (*1) | 30 | 20 | | 20 | 30 | | | | |
| Polyepoxide (ii) (*2) | | | | | | | | | 50 |
| Polyepoxide (iii) (*3) | | | | | | | | 25 | |
| Polyepoxide (iv) | | | 30 | | | 30 | 35 | | |
| Polyepoxide (v) | | | | | | | | | |
| Silicon compound (1) | | | | | | | | | |
| Silicon compound (2) | 10 | | | | 10 | 15 | | | 20 |
| Silicon compound (3) | | | | | | | 30 | 20 | |
| Silicon compound (4) | | 5 | 10 | 10 | | | | | |
| Silicon compound (5) (*4) | | | | | | | | | |
| Silicon compound (6) | | | | | | | | | |
| Aluminum chelate (*5) | 1.0 | 2.0 | | 1.0 | 0.5 | 1.5 | 1.5 | 1.0 | |
| Titanium chelate (*6) | | | | | | | | | 3.5 |
| Zirconium chelate (*7) | | | | | | | | | |
| Tin chelate (*8) | | | 5.0 | | | | | | |
| TIPAQUE CR 95 | 100 | 100 | 100 | 100 | 100 | 100 | 100 | 100 | 100 |

| | Example | | | | | | | | |
|---|---|---|---|---|---|---|---|---|---|
| | 10 | 11 | 12 | 13 | 14 | 15 | 16 | 17 | 18 |
| Hydroxyl-containing polyester resin | | | | | | | | | |
| Type | A | D | A | B | D | A | D | A | D |
| Amount | 75 | 60 | 75 | 69 | 25 | 70 | 15 | 55 | 25 |
| Polyepoxide (i) (*1) | | 20 | 10 | | | 25 | | | |
| Polyepoxide (ii) (*2) | | | | 30 | | | | | |
| Polyepoxide (iii) (*3) | 20 | | | | | | | | |
| Polyepoxide (iv) | | | | | 50 | | 75 | | |
| Polyepoxide (v) | | | | | | | | 30 | 50 |
| Silicon compound (1) | | | 15 | | 25 | 5 | | | 25 |
| Silicon compound (2) | | | | 1 | | | | 15 | |
| Silicon compound (3) | 5 | | | | | | 10 | | |
| Silicon compound (4) | | 20 | | | | | | | |
| Silicon compound (5) (*4) | | | | | | | | | |
| Silicon compound (6) | | | | | | | | | |
| Aluminum chelate (*5) | | 1.0 | 1.0 | | 2.0 | 2.0 | 1.0 | 1.5 | 2.0 |
| Titanium chelate (*6) | | | | | | | | | |
| Zirconium chelate (*7) | 0.1 | | | 2.0 | | | | | |
| Tin chelate (*8) | | | | | | | | | |
| TIPAQUE CR 95 | 100 | 100 | 100 | 100 | 100 | 100 | 100 | 100 | 100 |

| | Comparative Example | | | | | |
|---|---|---|---|---|---|---|
| | 1 | 2 | 3 | 4 | 5 | 6 |
| Hydroxyl-containing polyester resin | | | | | | |
| Type | E | E | A | B | C | A |
| Amount | 70 | 35 | 60 | 55 | 75 | 55 |
| Polyepoxide (i) (*1) | 25 | | 30 | | 20 | |
| Polyepoxide (ii) (*2) | | | | | | |
| Polyepoxide (iii) (*3) | | | | 25 | | |
| Polyepoxide (iv) | | 35 | | | | 30 |
| Polyepoxide (v) | | | | | | |
| Silicon compound (1) | 5 | | | | | |
| Silicon compound (2) | | | | | | |
| Silicon compound (3) | | 30 | | | | |
| Silicon compound (4) | | | | | | |
| Silicon compound (5) (*4) | | | 10 | 20 | 5 | |
| Silicon compound (6) | | | | | | 15 |

TABLE 1-continued

| | | | | | | |
|---|---|---|---|---|---|---|
| Aluminum chelate (*5) | 2.0 | 1.5 | 1.0 | 1.0 | 2.0 | 1.5 |
| Titanium chelate (*6) | | | | | | |
| Zirconium chelate (*7) | | | | | | |
| Tin chelate (*8) | | | | | | |
| TIPAQUE CR 95 | 100 | 100 | 100 | 100 | 100 | 100 |

The notations in Table 1 are as follows (*1) Polyepoxide (i): "EPOLEAD GT 401" (trade name, product of Daicel Chemical Industries, Ltd., ring-cleft ε-caprolactone chain containing tetrafunctional epoxy compound, molecular weight about 790)

(*2) Polyepoxide (ii): 3,4-epoxycyclohexylmethyl-3,4-epoxycyclohexane carboxylate (*3) Polyepoxide (iii): "EPIKOTE 1001" (trade name, product of Yuka Shell Epoxy Co., Ltd., bisphenol A epoxy resin, number average molecular weight about 900, epoxy equivalent about 490)

(*4) Silicon compound (5): "COLCOAT ES 40" (trade name, product of Nippon Colcoat Co., Ltd., approximately pentamer of tetraethyl silicate on an average, an average of about 12 ethoxy groups per molecule), for comparative purpose (*5) Aluminum chelate: Benzoyl acetonato-bis (acetylacetonato)aluminum (*6) Titanium chelate: Diisopropoxy-bis(ethylaceto-acetato) titanium (*7) Zirconium chelate: Tetrakis(ethylacetoacetato) zirconium (*8) Tin chelate: Bis(acetylacetonato)mono-butyltin acetate The coating compositions prepared in the Examples and Comparative Examples were tested for coating performance by the following test methods using test panels produced for the tests.

Production of Test Panels

KP Color-8652 primer (product of Kansai Paint Co., Ltd., polyester resin primer for precoating) was applied to an untreated aluminum panel of 0.4 mm in thickness to give a coating film of about 4 μm in dry thickness. The coated panel was baked for 40 seconds under conditions of a maximum temperature of 220° C. reached by the substrate. To the primer-coated panel were applied the coating compositions obtained in the Examples and Comparative Examples to form a coating film of about 18 μm in dry thickness. The coated panel was baked at an atmosphere temperature of 260° C. for 50 seconds (a maximum temperature of 220° C. reached by the substrate), giving a test panel.

Test Methods

Appearance

The test panel was visually inspected to evaluate the appearance of the coating by the following criteria: A, no undesired change; B, dull surface.

Gloss

60° Specular gloss according to JIS K 5400 7.6 (1990) (reflectance (%) at an incidence angle and light-receiving angle, both 60°)

Pencil Hardness

The coated surface was scratched by pencil to assess the degree of mar according to JIS K 5400 8.4.2.

Forming Ability

A test panel with its coated surface outwardly directed was bent at an angle of 180° in a chamber at 20° C. to determine a T value which does not cause cracking. The T value is 1T when a panel of the same thickness as the test panel is inserted between the folded parts of the panel bent at an angle of 180°; 2T when two panels of the same thickness is inserted therebetween; 3T when 3 panels of the same thickness are inserted; and 0T when nothing is inserted.

Solvent Resistance

A piece of gauze was soaked with methyl ethyl ketone. The coated surface of the test panel was rubbed with the soaked gauze reciprocally over a distance of about 5 cm under a load of about 1 kg/cm$^2$ in a chamber at 20° C. The rubbing was continued to count the reciprocal strokes involved until the primer coating became exposed. When the coated panel was not exposed by 50 reciprocal strokes, it was expressed in 50<.

Acid Resistance

The test panel was immersed in a 5% aqueous solution of sulfuric acid at 60° C. for 3 hours. The coated surface was visually evaluated according to the following criteria: A, no undesired change; B, pronouncedly impaired gloss.

Adhesion at Bend

The test panel with its coated surface outwardly directed was bent at an angle of 180° in a chamber at 20° C. Cellophane adhesive tape was applied to the folded parts of the panel and quickly removed to assess the extent of remaining coating (called "untreatment") in Table 2. The same test was conducted although different in that the test panel was dipped in boiling water for 2 hours before bending.

The result was rated as follows: A, substantially no coating removed; B, coating removed.

The results of the tests are shown in Table 2.

TABLE 2

| Test Item | Example | | | | | | | | | |
|---|---|---|---|---|---|---|---|---|---|---|
| | 1 | 2 | 3 | 4 | 5 | 6 | 7 | 8 | 9 | 10 |
| Appearance | A | A | A | A | A | A | A | A | A | A |
| Gloss | 90 | 88 | 90 | 88 | 87 | 93 | 87 | 90 | 90 | 86 |
| Pencil hardness | 2H | 2H | 2H | 2H | 2H | 2H | 2H | 2H | 2H | 2H |
| Forming ability | 3T | 3T | 3T | 3T | 3T | 3T | 3T | 3T | 3T | 3T |

TABLE 2-continued

| | | | | | | | | | | |
|---|---|---|---|---|---|---|---|---|---|---|
| Solvent resistance | 50< | 50< | 50< | 50< | 50< | 50< | 50< | 50< | 50< | 50< |
| Acid resistance | A | A | A | A | A | A | A | A | A | A |
| Adhesion at bend | | | | | | | | | | |
| Untreatment | A | A | A | A | A | A | A | A | A | A |
| After immersion of boiling water | A | A | A | A | A | A | A | A | A | A |

| | Example | | | | | | | |
|---|---|---|---|---|---|---|---|---|
| Test Item | 11 | 12 | 13 | 14 | 15 | 16 | 17 | 18 |
| Appearance | A | A | A | A | A | A | A | A |
| Gloss | 87 | 88 | 91 | 91 | 87 | 85 | 93 | 93 |
| Pencil hardness | 2H | 2H | 2H | 2H | 2H | 2H | 2H | 2H |
| Forming ability | 3T | 3T | 3T | 3T | 3T | 3T | 3T | 3T |
| Solvent resistance | 50< | 50< | 50< | 50< | 50< | 50< | 50< | 50< |
| Acid resistance | A | A | A | A | A | A | A | A |
| Adhesion at bend | | | | | | | | |
| Untreatment | A | A | A | A | A | A | A | A |
| After immersion of boiling water | A | A | A | A | A | A | A | A |

| | Comparative Example | | | |
|---|---|---|---|---|
| Test Item | 1 | 2 | 3 | 6 |
| Appearance | B | B | B | A |
| Gloss | 65 | 70 | 60 | 85 |
| Pencil hardness | 2H | 2H | 2H | HB |
| Forming ability | 3T | 3T | 3T | 3T |
| Solvent resistance | 50< | 50< | 50< | 50< |
| Acid resistance | B | B | B | A |
| Adhesion at bend | | | | |
| Untreatment | A | A | A | A |
| After immersion of boiling water | B | B | B | A |

What is claimed is:

1. A curable coating composition comprising:

(a) a hydroxyl-containing polyester resin having a solubility parameter in the range of 10.0 to 12.0, (b) a polyepoxide, (c) a silicon compound having 1 to 20 silicon atoms in one molecule and represented by the rational formula $$SiO_{(4-(a+b))/2}(OR^1)_a(OR^2)_b \quad (1)$$

wherein $R^1$ is an alkyl group having 1 to 3 carbon atoms, or a hydrogen atom, $R^2$ is an aryl group, an aralkyl group, or a monovalent hydrocarbon group containing an ether linkage and/or ester linkage and having 4 to 24 carbon atoms, a represents a number between 0.10 to 3.95 and b represents a number between 0.05 and 1.95, provided that a+b=4 or less, (d) at least one chelate compound selected from the group consisting of aluminum chelate compounds, titanium chelate compounds, zirconium chelate compounds and tin chelate compounds, and (e) an organic solvent.

2. The curable coating composition according to claim 1, wherein the polyester resin (a) has a hydroxyl value of 2 to 200 mg KOH/g.

3. The curable coating composition according to claim 1, wherein the polyester resin (a) has a glass transition temperature of −40° to 60° C.

4. The curable coating composition according to claim 1, wherein the polyepoxide (b) is an alicyclic polyepoxide.

5. The curable coating composition according to claim 1, wherein the polyepoxide (b) has a number average molecular weight of 120 to 20,000.

6. The curable coating composition according to claim 1, wherein the silicon compound (c) has 4 to 8 silicon atoms in one molecule and wherein the total of a and b in the formula (1) is 1.5 to 2.5.

* * * * *